(12) United States Patent
Choi

(10) Patent No.: US 7,956,975 B2
(45) Date of Patent: Jun. 7, 2011

(54) FLAT PANEL DISPLAY DEVICE

(75) Inventor: Jae Hyo Choi, Gyeongsangbuk-do (KR)

(73) Assignee: LG Display Co., Ltd., Seoul (KR)

(*) Notice: Subject to any disclaimer, the term of this patent is extended or adjusted under 35 U.S.C. 154(b) by 389 days.

(21) Appl. No.: 11/882,686

(22) Filed: Aug. 3, 2007

(65) Prior Publication Data

US 2008/0030643 A1 Feb. 7, 2008

(30) Foreign Application Priority Data

Aug. 7, 2006 (KR) .................. 10-2006-0074095

(51) Int. Cl.
G02F 1/1345 (2006.01)
(52) U.S. Cl. .............. 349/149; 349/150; 349/151
(58) Field of Classification Search ......... 349/149–151
See application file for complete search history.

(56) References Cited

U.S. PATENT DOCUMENTS

| | | | | |
|---|---|---|---|---|
| 5,640,216 A | * | 6/1997 | Hasegawa et al. | 349/58 |
| 5,805,249 A | * | 9/1998 | Hasegawa et al. | 349/59 |
| 5,815,224 A | * | 9/1998 | Hasegawa et al. | 349/58 |
| 5,946,062 A | * | 8/1999 | Hasegawa et al. | 349/58 |
| 6,515,679 B1 | * | 2/2003 | Igarashi | 345/698 |
| RE38,516 E | * | 5/2004 | Hasegawa et al. | 349/58 |
| 7,184,117 B2 | * | 2/2007 | Suzuki | 349/150 |
| RE40,130 E | * | 3/2008 | Hasegawa et al. | 349/58 |
| 7,446,825 B2 | * | 11/2008 | Shinohara et al. | 349/58 |
| 2005/0024573 A1 | * | 2/2005 | Suzuki | 349/149 |
| 2006/0055037 A1 | * | 3/2006 | Park et al. | 257/737 |
| 2006/0133018 A1 | * | 6/2006 | Okuda | 361/681 |
| 2006/0152664 A1 | * | 7/2006 | Nishio et al. | 349/150 |
| 2007/0019127 A1 | * | 1/2007 | Oohira | 349/58 |
| 2007/0024771 A1 | * | 2/2007 | Shinohara et al. | 349/58 |

FOREIGN PATENT DOCUMENTS

JP 2001091926 A * 4/2001

* cited by examiner

*Primary Examiner* — K. Cyrus Kianni
(74) *Attorney, Agent, or Firm* — Morgan, Lewis & Bockius LLP

(57) ABSTRACT

A flat panel display device is disclosed. The flat panel display device includes a flat display panel, a driving integrated circuit driving the flat display panel, a cover shield, and a flexible connecting film on which the driving integrated circuit is mounted. The cover shield includes adhesive areas each having an adhesive portion and a non-adhesive area having a non-adhesive portion. An end of the flexible connecting film is electrically connected to an edge of the flat display panel, and the other end is positioned in the non-adhesive area of the cover shield.

13 Claims, 2 Drawing Sheets

FLAT PANEL DISPLAY DEVICE

This application claims the benefit of Korea Patent Application No. 10-2006-0074095, filed in Korea on Aug. 7, 2006, which is hereby incorporated by reference in its entirety.

BACKGROUND OF THE INVENTION

1. Field of the Invention

Exemplary embodiments of the present invention relate to a flat panel display device.

2. Discussion of the Related Art

The importance of flat panel display devices has recently increased with the growth of multimedia. Various types of flat panel display devices such as liquid crystal display devices and organic light emitting devices have been put to practical use.

Out of the flat panel display devices, a liquid crystal display device includes a liquid crystal display panel displaying an image, a backlight unit providing the liquid crystal display panel with light, and a driving circuit driving the liquid crystal display panel. The driving circuit includes a driving integrated circuit, and a flexible connecting film on which the driving integrated circuit is mounted. The flexible connecting film is electrically connected to the liquid crystal display panel.

The flexible connecting film may be bent along the side of the liquid crystal display device due to physical properties of the flexible connecting film. In this case, the flexible connecting film may project toward the rear of the liquid crystal display device. Further, the projected flexible connecting film may be easily exposed to external force.

SUMMARY OF THE INVENTION

Accordingly, exemplary embodiments of the present invention provide a flat panel display device capable of protecting a flexible connecting film from external force.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect, a flat panel display device comprises a flat display panel, a driving integrated circuit that drives the flat display panel, a cover shield including adhesive areas each having an adhesive portion and a non-adhesive area having a non-adhesive portion, and a flexible connecting film on which the driving integrated circuit is mounted, an end of the flexible connecting film being electrically connected to an edge of the flat display panel and the other end being positioned in the non-adhesive area of the cover shield.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
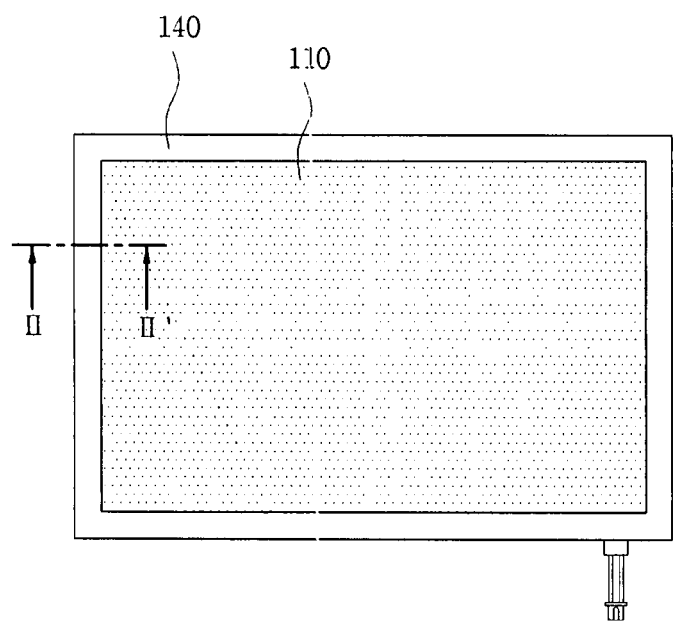
FIG. 1 schematically illustrates a liquid crystal display device according to an exemplary embodiment.
Figure 2:
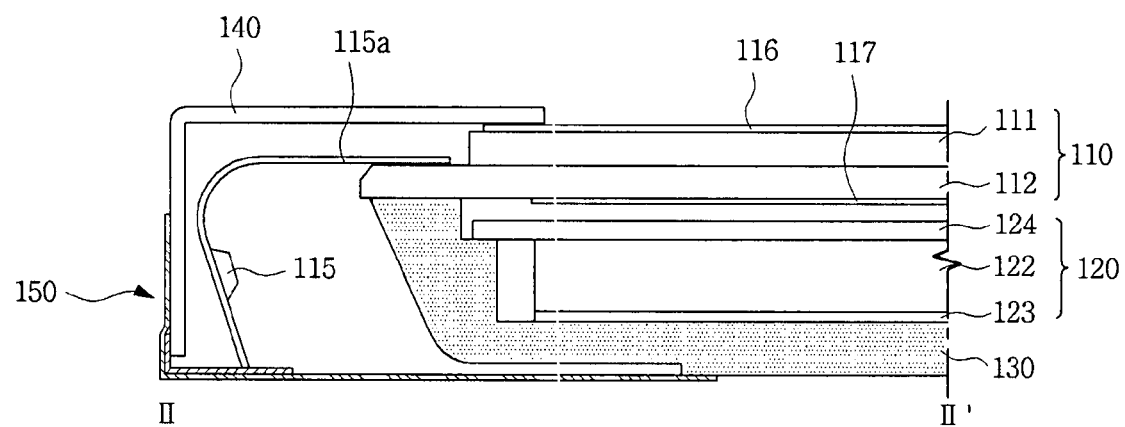
FIG. 2 is a cross-sectional view taken along line II-II' of FIG. 1.

FIG. 1 schematically illustrates a liquid crystal display device according to an exemplary embodiment. FIG. 2 is a cross-sectional view taken along line II-II' of FIG. 1. FIGS. 1 and 2 illustrate a liquid crystal display device as a flat panel display device. However, since the liquid crystal display device of FIGS. 1 and 2 is only intended merely to be illustrative, an exemplary embodiment of the present invention is not limited thereto. For instance, an exemplary embodiment of the present invention may be applied to an organic light emitting device.

As illustrated in FIGS. 1 and 2, the liquid crystal display device according to an exemplary embodiment includes a liquid crystal display panel 110 displaying an image, a backlight unit 120 positioned backward the liquid crystal display panel 110, a main supporter 130 receiving the liquid crystal display panel 110 and the backlight unit 120, a top case 140 positioned in front of the liquid crystal display panel 110, and a cover shield 150 positioned backward the main supporter 130.

Figure 3:
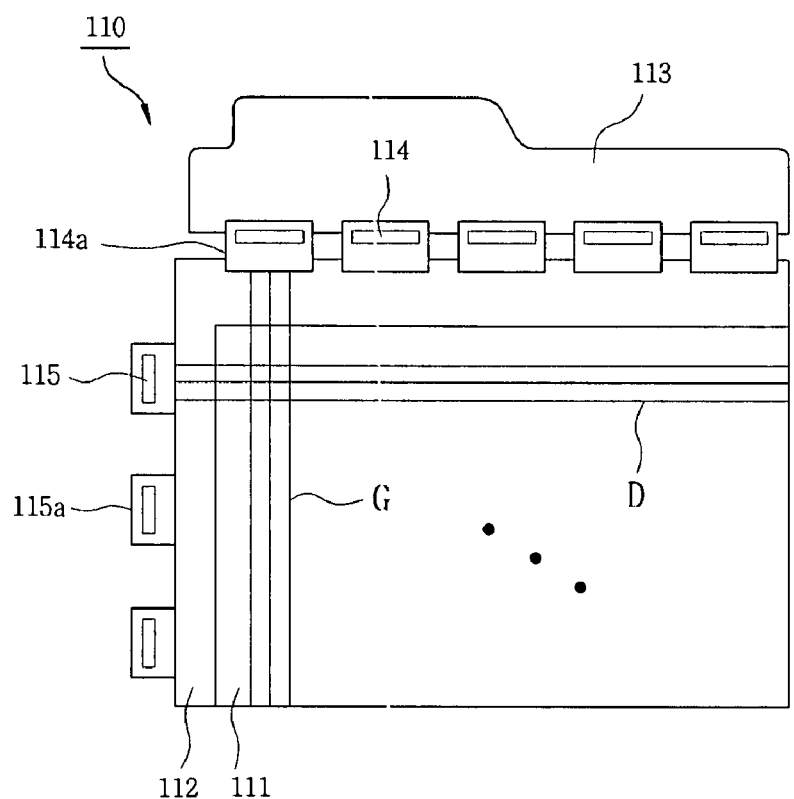
FIG. 3 illustrates the structure of a liquid crystal display panel of FIG. 1.

FIG. 3 illustrates the structure of a liquid crystal display panel of the liquid crystal display device of FIG. 1.

As illustrated in FIGS. 2 and 3, the liquid crystal display panel 110 includes an upper substrate 111 and a lower substrate 112 that face each other. A liquid crystal layer (not shown) is positioned between the upper substrate 111 and the lower substrate 112. An upper polarizer 116 and a lower polarizer 117 are positioned on the upper substrate 111 and under the lower substrate 112, respectively.

A plurality of gate lines G and a plurality of data lines D are arranged to intersect each other on the lower substrate 112. A pixel area is defined by intersections of the gate lines G and the data lines D at a right angle. A thin film transistor (not shown) is positioned in each pixel area.

At least one gate driving integrated circuit (IC) 115 for driving the gate lines G is positioned at one edge of the lower substrate 112. At least one data driving integrated circuit (IC) 114 for driving the data lines D is positioned at the other edge of the lower substrate 112.

The gate driving IC 115 is mounted on a gate flexible connecting film 115a, and electrically connected to the gate lines G. The data driving IC 114 is mounted on a data flexible connecting film 114a, and electrically connected to the data lines D. A data printed circuit board (not shown) is disposed to be connected to the other edge of the data flexible connecting film 114a. Various kinds of driving circuits may be mounted on the data printed circuit board to apply control signals and driving voltage signals required to drive the data driving IC 114 and the gate driving IC 115.

The gate flexible connecting film 115a and the data flexible connecting film 114a each have bending characteristics. The gate flexible connecting film 115a and the data flexible connecting film 114a may be formed in the form of a tape carrier package (TCP) or a chip-on film (COF).

Accordingly, the gate flexible connecting film 115a and the data flexible connecting film 114a each may be bent toward the rear of the liquid crystal display panel 110 during the assembly of the liquid crystal display device in a state where the gate flexible connecting film 115a and the data flexible connecting film 114a are connected to both edges of the liquid crystal display panel 110, respectively.

Referring again to FIGS. 1 and 2, the backlight unit 120 is positioned in the rear of the liquid crystal display panel 110, and provides the liquid crystal display panel 110 with light.

The backlight unit 120 includes a light source (not shown) producing light, a light guide plate 122, a reflective sheet 123, and an optical sheet 124. The light guide plate 122 provides light produced by the light source for the entire surface of the liquid crystal display panel 110. The reflective sheet 123 is positioned in the rear of the light guide plate 122, and reflects light transmitted through the rear of the light guide plate 122. The optical sheet 124 is positioned in front of the light guide plate 122, and improves optical characteristics of light transmitted through the light guide plate 122. The optical sheet 124 may include a diffusion sheet, a prism sheet, and a protective sheet.

The main supporter 130 includes stepped receiving members for receiving the liquid crystal display panel 110 and the backlight unit 120.

The top case 140 is formed in the form of rectangular-shaped frame. The top case 140 surrounds all sides of the liquid crystal display panel 110 and covers the side of the main supporter 130.

The cover shield 150 covers the gate flexible connecting film 115a to protect the gate flexible connecting film 115a. The cover shield 150 is positioned in the rear of the main supporter 130 and coupled with the side of the top case 140.

Figure 4:
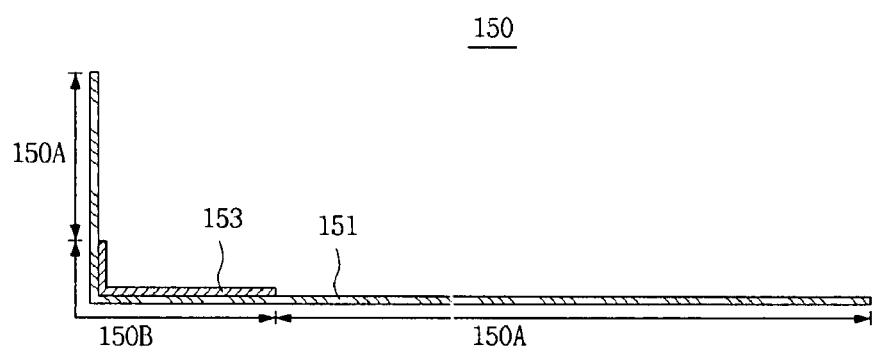
FIG. 4 illustrates a cover shield of FIG. 2.

FIG. 4 illustrates a cover shield of FIG. 2.

As illustrated in FIG. 4, the cover shield 150 may be formed in a band form for covering the gate flexible connecting film 115a. The cover shield 150 includes adhesive areas 150A attached to the side of the top case 140 and a lower surface of the main supporter 130, respectively, and a non-adhesive area 150B positioned between the adhesive areas 150A.

The adhesive area 150A and the non-adhesive area 150B may be formed using two adhesive tapes 151 and 153. More specifically, the adhesive area 150A and the non-adhesive area 150B can be formed by attaching the adhesive tape 151 of a wide width to the adhesive tape 153 of a narrow width so that the adhesive tape 151 of the wide width and the adhesive tape 153 of the narrow width face each other.

The adhesive area 150A corresponds to an adhesive surface of the adhesive tape 151. The non-adhesive area 150B corresponds to a non-adhesive surface obtained by positioning the adhesive tape 153 to face on the adhesive tape 151 and then attaching an adhesive surface of the adhesive tape 153 to the adhesive surface of the adhesive tape 151.

The non-adhesive area 150B is connected to an edge of the liquid crystal display panel 110, and corresponds to a formation location of the other edge of the gate flexible connecting film 115a bent in the rear of the liquid crystal display panel 110. In other words, the other edge of the gate flexible connecting film 115a is positioned in the non-adhesive area 150B. Accordingly, the gate flexible connecting film 115a is not fastened by the adhesive tape 151 and may smoothly move on the adhesive tape 151.

When the liquid crystal display device receives a vibration from the outside (for example, when a vibration test is performed on the liquid crystal display device), a load is not applied to the gate flexible connecting film 115a because the gate flexible connecting film 115a is not fastened on the non-adhesive area 150B of the cover shield 150 and slides on the non-adhesive area 150B. Accordingly, a damage to the gate flexible connecting film 115a can be prevented.

The liquid crystal display panel 110 and the backlight unit 120 are received and mounted inside the main supporter 130. The gate flexible connecting film 115a is connected to an edge of the liquid crystal display panel 110, and is bent along the side of the main supporter 130 in the rear of the liquid crystal display panel 110. The top case 140 is mounted to surround all the sides of the liquid crystal display panel 110. Since both ends of the cover shield 150 are attached to a rear surface of the main supporter 130 and the side of the top case 140, respectively, the cover shield 150 covers the gate driving IC 115 mounted on the gate flexible connecting film 115a.

An end of the gate flexible connecting film 115a may project longer than an end of the main supporter 130.

However, although the end of the gate flexible connecting film 115a projects longer than the end of the main supporter 130, it is easy that a location of the end of the gate flexible connecting film 115a corresponds to a location of the end of the main supporter 130 because the gate flexible connecting film 115a is easily bent because of the physical properties of the gate flexible connecting film 115a. Furthermore, the gate flexible connecting film 115a is not attached to the adhesive tape 151 of the cover shield 150 when the cover shield 150 is mounted, and the gate flexible connecting film 115a is positioned in the non-adhesive area 150B. Therefore, the gate flexible connecting film 115a can move freely.

When the liquid crystal display device receives an impact from the outside (for example, when a vibration test is performed on the liquid crystal display device), the gate flexible connecting film 115a is not damaged by the external impact or stress because the gate flexible connecting film 115a is not fastened on the non-adhesive area 150B of the cover shield 150 and smoothly slides on the non-adhesive area 150B. Accordingly, the reliability of the liquid crystal display device can be improved.

Since the cover shield 150 is fabricated using only the two adhesive tapes 151 and 153, fabrication cost of the liquid crystal display device can be reduced due to a reduction in fabrication cost of the cover shield 150. Furthermore, the liquid crystal display device can be fabricated using a simple fabrication process due to a reduction in components of the liquid crystal display device, and thus process efficiency of the liquid crystal display device is improved.

Although the explanation was given of an example of a process for achieving the non-adhesive area 150B using the two adhesive tapes 151 and 153 in an exemplary embodiment of the present invention, an exemplary embodiment of the present invention is not limited thereto. For example, a wide adhesive tape having one adhesive surface and a protection member having a softly external surface and two non-adhesive surfaces may be used to achieve the non-adhesive area 150B. In other words, the protection member may be attached to the wide adhesive tape to achieve the non-adhesive area 150B of the cover shield 150. In this case, a portion of the adhesive surface of the wide adhesive tape may not be exposed by the protection member.

Although the explanation was given of an example of the gate flexible connecting film 115a in an exemplary embodiment of the present invention, an exemplary embodiment of the present invention may be applied to the data flexible connecting film 114a. An exemplary embodiment of the present invention may be applied to the data flexible connecting film 114a regardless of the size of the liquid crystal display device as long as the liquid crystal display device adopts the structure of the gate flexible connecting film 115a equipped with the gate driving IC 115 for driving the gate lines and/or the structure of the data flexible connecting film 114*a* equipped with the data driving IC 114 for driving the data lines.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A flat panel display device comprising:
   a flat display panel;
   a driving integrated circuit that drives the flat display panel;
   a cover shield including adhesive areas each having an adhesive portion and a non-adhesive area having a non-adhesive portion, wherein the adhesive areas and the non-adhesive area are formed on one surface of the cover shield; and
   a flexible connecting film on which the driving integrated circuit is mounted, an end of the flexible connecting film being electrically connected to an edge of the flat display panel and another end being positioned in the non-adhesive area of the cover shield so that the another end is movable.

2. The flat panel display device of claim 1, further comprising:
   a main supporter receiving the flat display panel; and
   a top case surrounding all sides of the flat display panel.

3. The flat panel display device of claim 2, wherein the adhesive areas of the cover shield are attached to the side of the top case and a lower surface of the main supporter using their adhesive portions, respectively.

4. The flat panel display device of claim 3, wherein the non-adhesive area of the cover shield is positioned between the adhesive areas.

5. The flat panel display device of claim 3, wherein the cover shield is formed of two adhesive tapes each having one adhesive surface.

6. The flat panel display device of claim 5, wherein the non-adhesive area of the cover shield is formed by attaching the two adhesive surfaces of the two adhesive tapes to each other so that the two adhesive surfaces face each other.

7. The flat panel display device of claim 3, wherein the cover shield is formed of an adhesive tape having one adhesive surface, and a protection member having two non-adhesive surfaces.

8. The flat panel display device of claim 7, wherein the non-adhesive area of the cover shield is formed by attaching the protection member to the adhesive surface of the adhesive tape.

9. The flat panel display device of claim 1, wherein the flexible connecting film is a tape carrier package (TCP).

10. The flat panel display device of claim 1, wherein the flexible connecting film is a chip-on film (COF).

11. The flat panel display device of claim 1, wherein the driving integrated circuit is a gate driving integrated circuit for driving gate lines of the flat display panel.

12. The flat panel display device of claim 1, wherein the driving integrated circuit is a data driving integrated circuit for driving data lines of the flat display panel.

13. The flat panel display device of claim 1, wherein the flat display panel is a liquid crystal display panel.

* * * * *